US012775768B2

(12) United States Patent
Ahmed et al.

(10) Patent No.: US 12,775,768 B2
(45) Date of Patent: Oct. 27, 2026

(54) THERMAL AWARE TIMING ANALYSIS

(71) Applicant: Synopsys, Inc., Mountain View, CA (US)

(72) Inventors: Khadeer Ahmed, Milpitas, CA (US); Peivand Tehrani, Campbell, CA (US); Martin Ranke, Sunnyvale, CA (US)

(73) Assignee: Synopsys, Inc., Sunnyvale, CA (US)

( * ) Notice: Subject to any disclaimer, the term of this patent is extended or adjusted under 35 U.S.C. 154(b) by 790 days.

(21) Appl. No.: 18/309,549

(22) Filed: Apr. 28, 2023

(65) Prior Publication Data

US 2026/0119764 A1 Apr. 30, 2026

(51) Int. Cl.
*G06F 30/3312* (2020.01)
*G06F 119/08* (2020.01)
*G06F 119/12* (2020.01)

(52) U.S. Cl.
CPC ...... *G06F 30/3312* (2020.01); *G06F 2119/08* (2020.01); *G06F 2119/12* (2020.01)

(58) Field of Classification Search
USPC .......................................................... 716/113
See application file for complete search history.

(56) References Cited

U.S. PATENT DOCUMENTS

2013/0239079 A1* 9/2013 Tetelbaum .......... G06F 30/3312 716/113
2015/0370955 A1* 12/2015 Ahlen ................ G06F 30/3312 716/113
2016/0357894 A1* 12/2016 Frederick, Jr. ...... G06F 30/3312
2022/0004688 A1* 1/2022 Srinivasan ............ G06F 30/337

FOREIGN PATENT DOCUMENTS

KR 102436880 B1 * 8/2022 ......... G06F 30/3312

* cited by examiner

*Primary Examiner* — Mohammed Alam
(74) *Attorney, Agent, or Firm* — Fenwick & West LLP

(57) ABSTRACT

In some aspects, timing metrics for timing paths of a circuit design are accessed. These timing metrics were evaluated at a first temperature. The circuit design includes multiple components. Location-dependent temperature information for the components and a thermal derate schedule are also accessed. The thermal derate schedule specifies adjustments to timing metrics as a function of temperature. A processing device adjusts the timing metrics based on the thermal derate schedule and based on differences between the first temperature and the location-dependent temperature information for the respective components of the circuit design.

19 Claims, 8 Drawing Sheets

| | | | | |
|---|---|---|---|---|
| Distance | D1 | D2 | D3 | D4 |
| Delta Temp | T1 | T2 | T3 | T4 |

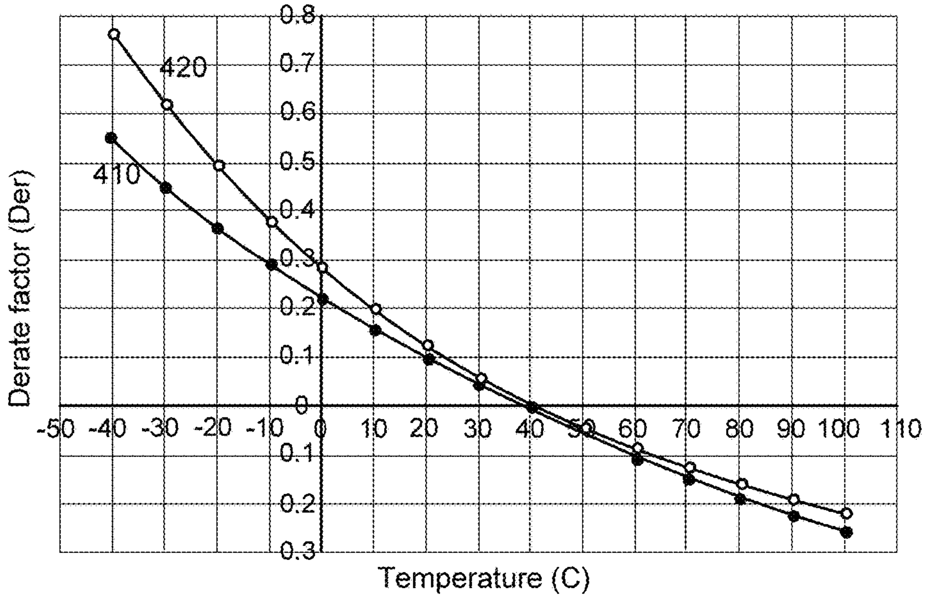
FIG. 4
500 LIB lib_name *[voltage & temperature can be determined from library, T derates scalable by voltage]*
510 TEMPERATURES *[Temperature in Celsius]*
1 -40
2 -30
...
9 40 *[Nominal library temperature]*
...
15 120
END TEMPERATURES
520 DERATES_COLUMNS {cell_rise_min cell_rise_max cell_fall_min cell_fall_max ocv_sigma_cell_rise ocv_sigma_cell_fall}
530 TEMPERATURES_DERATES
INV {1.0 0.765 0.762 0.752 0.758 0.655 0.658} ... {9.0 0 0 0 0 0 0} ... {15.0 -0.265 -0.262 -0.252 -0.258 -0.255 -0.258}
BUF {1.0 0.765 0.762 0.752 0.758 0.655 0.658} ... {9.0 0 0 0 0 0 0} ... {15.0 -0.265 -0.262 -0.252 -0.258 -0.255 -0.258}
END TEMPERATURES_DERATES
FIG. 5
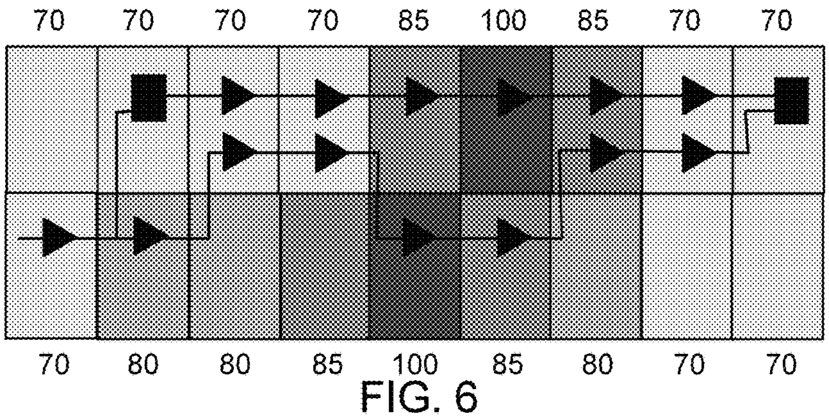
FIG. 6

THERMAL AWARE TIMING ANALYSIS

TECHNICAL FIELD

The present disclosure relates generally to an electronic design automation (EDA) system for designing and verifying circuit designs. In particular, the present disclosure relates to timing analysis that accounts for thermal effects.

BACKGROUND

Electronic design automation (EDA) tools are used by engineers to design, verify and test electronic circuits. EDA tools are important because they automate and streamline the complex process of circuit design, from conceptualization to design signoff to manufacturing. They are ever more important as electronic circuits and systems become more complex, with increasingly stringent design constraints and requirements.

One aspect of EDA is timing analysis. Timing analysis is used to ensure that the timing requirements of an electronic circuit are met. For example, timing analysis may predict the propagation delays along different signal paths in the circuit to determine if the signals propagate with a timing that meets the timing requirements of the circuit. Identified problems may then be fixed by the designer, possibly with the assistance of EDA tools.

SUMMARY

In some aspects, timing metrics for timing paths of a circuit design are accessed. These timing metrics were evaluated at a first temperature. The circuit design includes multiple components. Location-dependent temperature information for the components and a thermal derate schedule are also accessed. The thermal derate schedule specifies adjustments to timing metrics as a function of temperature. A processing device adjusts the timing metrics based on the thermal derate schedule and based on differences between the first temperature and the location-dependent temperature information for the respective components of the circuit design.

In other aspects, a multi-scenario timing analysis of a circuit design is performed. The multi-scenario considers different combinations of timing scenarios and thermal scenarios for the circuit design, including at least two different thermal scenarios. For different combinations of timing scenario and thermal scenario in the multi-scenario: timing metrics for timing paths of the circuit design are adjusted based on a thermal derate schedule. The timing metrics before adjustment are evaluated at a first temperature for the timing scenario, and the adjustment is based on differences between the first temperature and location-dependent temperature information for the thermal scenario. The adjusted timing metrics from the different combinations are combined to generate timing metrics for the multi-scenario.

In yet more aspects, a thermal derate schedule is applied to adjust timing metrics of a circuit design evaluated at a first temperature, based on differences between the first temperature and location-dependent temperature information for the circuit design. Timing violations are identified based on the adjusted timing metrics. Corrections of the timing violations are applied, and the thermal derate schedule is also applied to evaluate timing metrics of candidate corrections.

Other aspects include components, devices, systems, improvements, methods, processes, applications, computer readable mediums, and other technologies related to any of the above.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

FIG. 4 is a curve of derate factor as a function of temperature according to embodiments of the present disclosure.

FIG. 5 shows an example file for a thermal derate schedule according to embodiments of the present disclosure.

FIG. 6 illustrates thermal derating of a timing path according to embodiments of the present disclosure.

DETAILED DESCRIPTION

Figure 1:
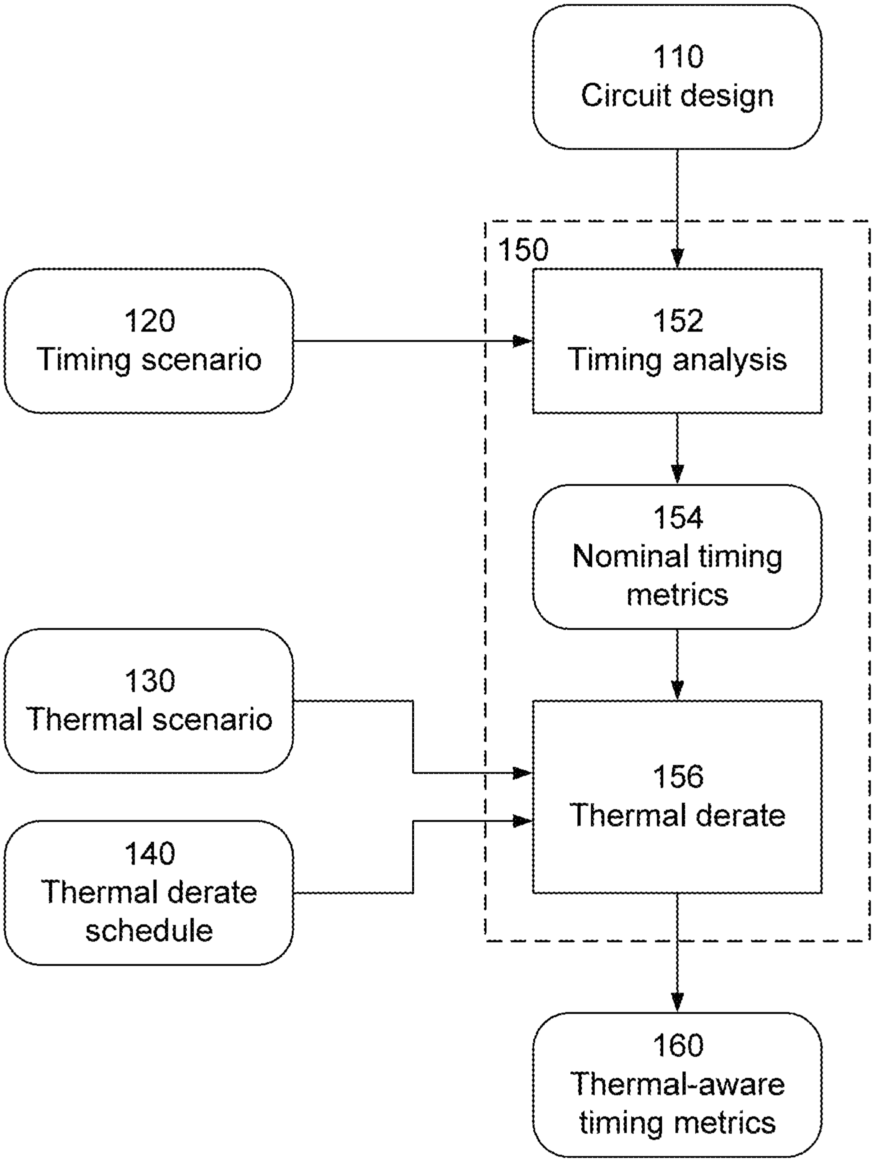
FIG. 1 is a flow diagram of adjusting timing metrics to account for thermal effects according to embodiments of the present disclosure.

Aspects of the present disclosure relate to thermal aware timing analysis. Timing analysis is an important aspect in the design of electronic circuits. However, the operation of electronic circuits depends on temperature. With the proliferation of advanced technology nodes, larger chips, and stacked and 3D integrated circuits, temperature distributions and thermal gradients can vary significantly across an integrated circuit.

For example, a stacked integrated circuit may have a stack of three or more dies. The center of the stack is sandwiched between dies above and below, and heat transfer to the edges may also be limited due to the geometry. As a result, hot spots may develop. The temperature gradients may radiate outwardly from the hot spots on the chip and impact both horizontally and vertically in these complex chip packages. These thermal effects increase with the power density of the circuits and can also change with different usage modes of the chip. In such situations, the circuit performance is affected, possibly leading to unforeseen timing failures if the thermal effects are not adequately considered.

As a result, it is important to account for thermal effects on timing during the design process. In addition, because a very large number of timing calculations are performed for each design iteration and because there can also be a large number of design iterations and a large number of different scenarios to consider, it is also important to use an approach whereby the thermal effects can be calculated in a fast and computationally efficient manner.

In some aspects, thermal effects are accounted for by using thermal derating. A timing metric, such as delay or slew, is determined at some nominal temperature for a timing path. The actual temperature and temperature variation across the timing path may be different than the nominal temperature. A thermal derate factor accounts for the change in the timing metric, due to this difference in temperature. In one approach, the timing metric at nominal temperature is multiplied by the thermal derate factor, which is a function of the temperature difference. The actual temperature for the timing path may be defined by a thermal map of the circuit. The thermal derate factor may be specified by a thermal derate schedule.

This approach is scalable because of its simplicity. Timing metrics may be evaluated for many different scenarios: different combinations of voltage domains, different clock frequencies, different operating modes of the circuit, different process, voltage, temperature (PVT) corners, and different resistance-capacitance (RC) corners, to name a few. These will be referred to as timing scenarios. The temperature variation across the chip may also be different depending on the conditions of the external environments or the operation of the chip, for example. These will be referred to as thermal scenarios. Different combinations of timing scenarios and thermal scenarios may be analyzed in a straightforward manner using thermal derate schedules.

Technical advantages of the present disclosure include, but are not limited to, the following. First, accounting for thermal effects makes the timing analysis more accurate. This can avoid costly errors. A more accurate analysis also means that a lower safety margin may be used in the design of the integrated circuit. Second, the use of thermal derate schedules is simple. The schedules themselves do not require much data storage, which reduces memory and storage requirements compared to more complex approaches. The calculations are also simple, which reduces processor time. As a result, this approach can also be applied to larger circuits and across more scenarios. This allows thermal-aware timing analysis to be performed concurrently for multiple combinations of different thermal scenarios and timing scenarios (and corresponding thermal derate schedules). This will be referred to as multi-scenario timing analysis, where multi-scenario refers to different combinations of thermal scenarios and timing scenarios. Concurrent analysis of multiple combinations of thermal and timing scenarios can also lead to faster design convergence, compared to other approaches that are limited to considering different situations one at a time.

In more detail, FIG. 1 is a flow diagram of adjusting timing metrics to account for thermal effects according to embodiments of the present disclosure. In this example, timing analysis is performed for circuit design 110. The circuit design 110 is analyzed given a certain temperature profile (thermal scenario 130) and given certain other conditions that affect timing (timing scenario 120). The effects of temperature on the timing metrics of interest are modeled by a thermal derate schedule 140.

Example timing metrics include delay and slew. Delay is the amount of time required for a signal to propagate along a path in the circuit design, which may be referred to as a timing path for convenience. Slew is the rate at which a signal transitions from high to low or vice versa. These timing metrics can be used to determine whether there are any timing violations, such as setup violations or hold violations. Digital circuits are clocked. A setup violation occurs when the data path is too slow, and an incoming data signal does not arrive early enough (e.g., within a threshold time) relative to an edge of the clock. A hold violation occurs when an incoming data signal is not held for long enough. It changes too soon (e.g., does not satisfy a threshold time) relative to an edge of the clock. Examples of other timing violations include recovery, removal, pulse width, and period violations. The temperature of circuits in the timing path can affect timing metrics and whether a timing violation occurs.

Timing may be evaluated for various different scenarios, which are referred to as timing scenarios. FIG. 1 shows the calculation for one timing scenario 120. Examples of different timing scenarios 120 include different combinations of voltage domains, different clock frequencies, different operating modes of the circuit, different process, voltage, temperature (PVT) corners, and different resistance-capacitance (RC) corners. If thermal effects are not considered, the timing metrics may be computed assuming some nominal temperature, at 152 in FIG. 1. For clarity, the resulting metrics may be referred to as nominal timing metrics 154.

Figure 2:
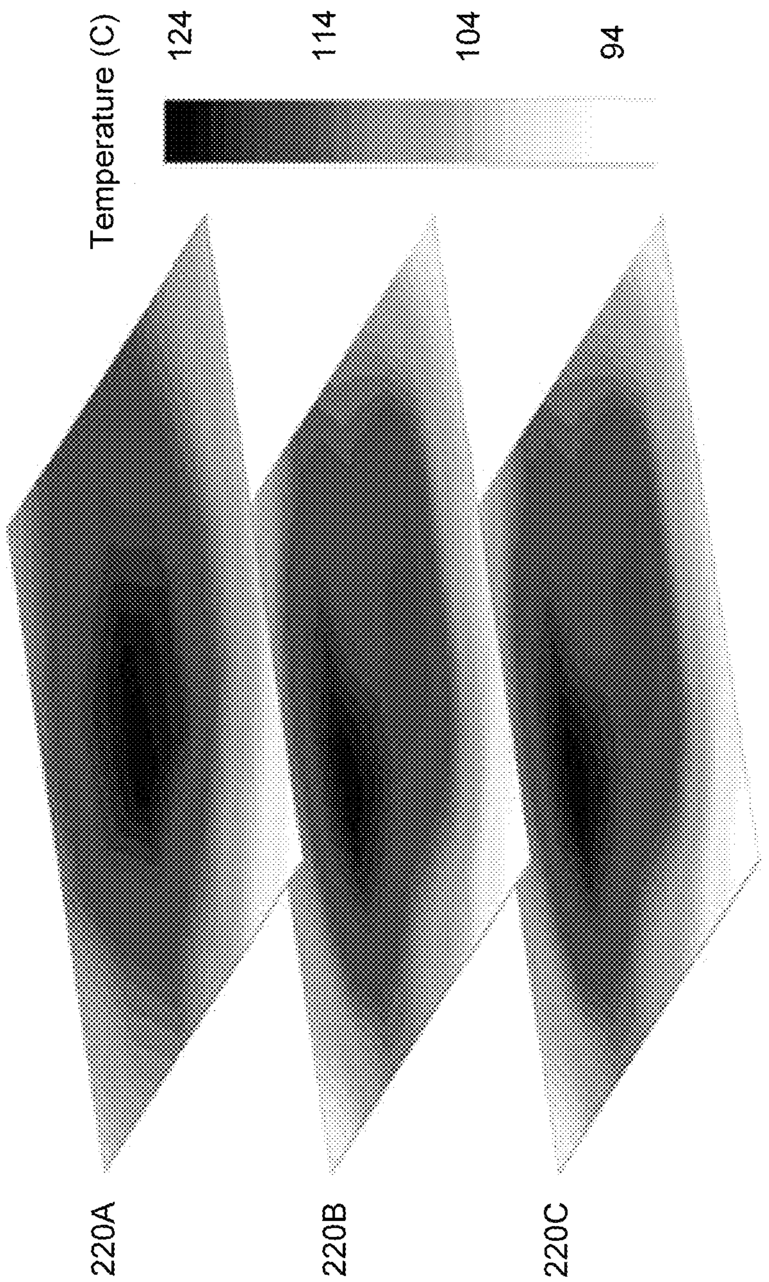
FIG. 2 shows a thermal map of different layers of a 3DIC, according to embodiments of the present disclosure.

Temperature variations are specified by the thermal scenario 130, and the effects on timing are accounted for by the thermal derate schedule 140. The thermal scenario 130 provides location-dependent temperature information for the circuit design. Examples include a thermal map and a thermal gradient listing. FIG. 2 shows a thermal map of different layers of a 3DIC, according to embodiments of the present disclosure. A 3DIC may have multiple layers. Some layers may contain active devices and other layers may contain interconnects. FIG. 2 shows two-dimensional thermal maps 220A-C for three layers of the device. Each two-dimensional layer 220 of the thermal map shows the temperature distribution on one of the layers of the 3DIC, where the temperature is represented by grayscale. This thermal map captures temperature information across three dimensions of the circuit design. The thermal map may be generated by an EDA tool that performs a thermal analysis of the design of the 3DIC and its surrounding environment, for example considering the package, die material, neighboring chips and any external heat removal. The power density of the circuit for the given operating mode and other internal configuration and operation of the 3DIC may also be considered, since higher operating powers generate more heat.

Figures 3A, 3B:
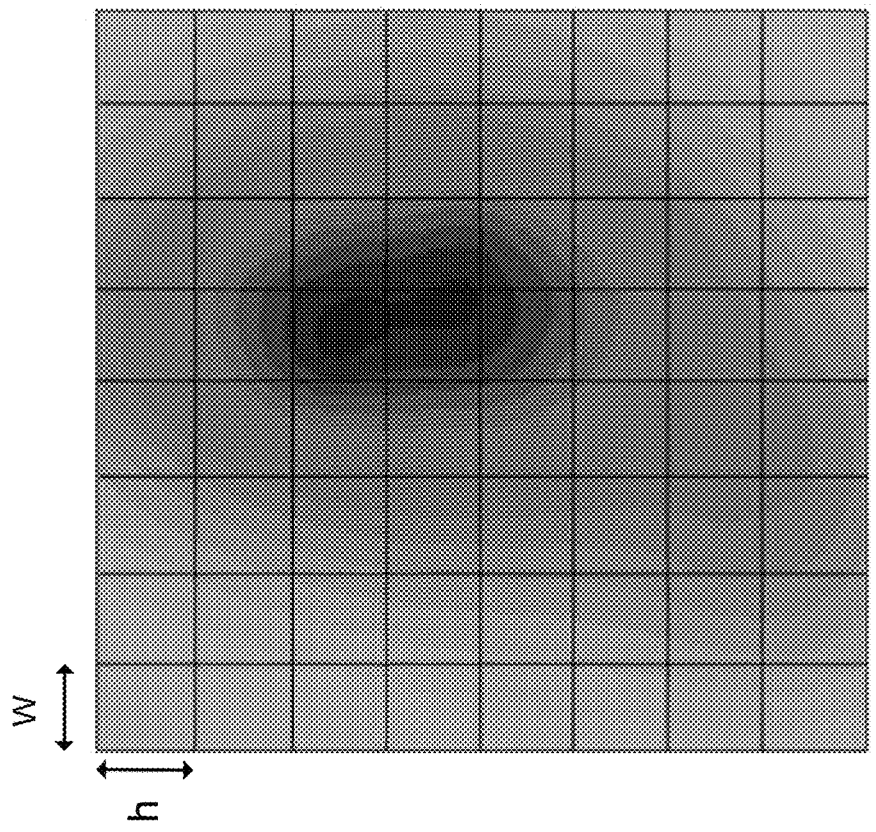
FIG. 3A shows tiling of a thermal map according to embodiments of the present disclosure.
FIG. 3B shows tabulation of thermal gradients according to embodiments of the present disclosure.

FIGS. 3A and 3B show further processing of a thermal map. First, the thermal map of FIG. 2 may be reduced to a coarser-grained thermal map, as shown in FIG. 3A. In FIG. 3A, the grayscale variations are the thermal map sampled on a fine-grained grid. This is mapped to a coarser M×N grid of tiles of width w and height h, as shown in FIG. 3A. Each tile contains multiples samples of the original fine-grained thermal map. The value for each tile may be computed as the average temperature of the fine-grained samples within the tile, or the maximum or minimum temperature within the tile. The thermal map may include multiple values per tile, such as the minimum, average and maximum value within each tile.

FIG. 3B shows an even coarser characterization of the temperature distribution, which is a tabulation of the thermal gradient. This example tabulates the maximum temperature difference as a function of distance. T1 is the maximum temperature difference between all tiles that are separated by a distance D1. In this example, the distance is measured as the Manhattan distance. In some embodiments, the user can choose to represent the thermal scenario 130 by either a thermal map or thermal gradient table. For example, the user may choose the thermal gradient table earlier in the design process because it is faster to compute although more conservative, and then switch to the thermal map later in the design process.

The thermal derate schedule 140 in FIG. 1 models the effect of temperature on the timing metric of interest. In one approach, using delay as the timing metric, a thermal derate factor may be defined as:

$$Der_T = (D_T - D_N)/|D_N| \quad (1)$$

where $Der_T$ is the derate factor at temperature T, $D_T$ is the delay at temperature T, and $D_N$ is the delay at the nominal temperature. Solving for $D_T$ yields:

$$D_T = (1 - Der_T)D_N \text{ when } D_N < 0 \quad (2A)$$

$$D_T = (1 + Der_T)D_N \text{ when } D_N >= 0 \quad (2B)$$

The adjusted delay is equal to the nominal delay times (1+/−the derate factor). If there are multiple derate factors that account for different effects, they may be compounded in a multiplicative manner or in an additive manner. If the derate factors are $Der_1$, $Der_2$, etc., then multiplicative compounding yields an aggregate factor of $(1+Der_1)(1+Der_2)$ . . . in Eqn. 2B. Additive compounding yields $(1+Der_1+Der_2+$ . . . ) in Eqn. 2B.

Timing paths may be interconnected cells from a cell library. The library may include timing models for each of the cells, which are used to generate the nominal timing metrics. The nominal temperature is then the temperature at which the library cells have been characterized. This results in a derate factor of 0 for library cells at the nominal library temperature.

FIG. 4 is a curve of derate factor Der as a function of temperature T. FIG. 4 shows two curves 410 and 420 which represent the minimum and maximum values of Der, respectively. This defines a range for Der. Der=0 at the nominal library temperature of 40 C. The thermal derate schedule captures the information shown in FIG. 4. The schedule may take the form of a lookup table or of a parameterized curve, for example.

Note that the derate factor is not always a monotonic function of temperature. In some cases, the delay through a device may first decrease as the device warms up and then increase as the device overheats. Even when the derate factor is a monotonic function of temperature, it may be either monotonically increasing or monotonically decreasing, depending on the device and on operating conditions. For example, different VT (threshold voltage) class devices could have either monotonically increasing or decreasing derate curves.

FIG. 5 shows an example file for a thermal derate schedule. A characterization process may be used to develop the thermal derate schedule. These files can be generated by either the foundry or by the user. The thermal derate schedule in FIG. 5 is for a particular library, as indicated by the library name 500 in this example. The thermal derate schedule captures the temperature effects in the derate curves for the different cells/components in the library. In this example, the derate curves are represented by lookup tables. Section 510 provides the values of temperature T for the lookup tables. Sample point 1 corresponds to T=−40 C, sample point 2 corresponds to T=−30 C, etc. Section 520 identifies which timing metrics are being derated. In this example, derate factors are provided for six different timing metrics. Section 530 provides the Der values for the lookup tables. Each row in section 530 provides the derate factors for a different cell/component or groups of cells: INV, BUF, etc. Within each row, each set of numbers are the derate factors for the corresponding temperature. For INV, the first set of numbers {1.0 0.765 0.762 . . . } is interpreted as follows. 1.0 refers to the sample number (temperature of −40 C). 0.765 is the derate factor at that temperature for the first timing metric cell_rise_min, 0.762 is the derate factor at that temperature for the second timing metric cell_rise_max, and so on. The ninth set of numbers {9.0 0 0 . . . } are for the nominal temperature, so all the derate factors are 0. This also means that the temperature of the nominal library is at 40 C.

Referring back to FIG. 1, at 156, the location-dependent temperature information for thermal scenario 130 and the thermal derate schedule 140 are used to adjust the nominal timing metrics 154, to produce the derated (thermal-aware) timing metrics 160. FIG. 6 shows an example. FIG. 6 shows a timing path with interconnected cells. The rectangles are the start and end of the timing path which may be registers gates or design ports. The triangles are other gates along the timing paths. All of these elements are library cells. The timing path is overlaid on the tiles from the thermal map, which shows the temperature distribution for that thermal scenario. This could be done in multiple ways. The physical location and dimensions of different devices (cells) may be provided as part of the circuit design database. The thermal map provides thermal information (e.g., temperature) as a function of physical location. The physical locations may then be used to determine the overlay of devices onto the thermal map.

In FIG. 6, the temperature is shown both as grayscale and by number of degrees Celsius. The nominal values of the timing metric may be calculated using timing models of the individual cells from the library. The timing behavior of each cell may be derated based on the thermal map and the thermal derate curve for that cell. These may be combined to derive the derated values of the timing metrics, which then account for the thermal effects of that particular thermal scenario.

In FIG. 1, the generation of derated timing metrics 160 is shown as two separate steps: timing analysis based on nominal temperature (152) followed by thermal derating (156). These two steps may be performed together, as indicated by the dashed box 150. This will be referred to as thermal-aware timing analysis. For example, the timing analysis EDA tool may be modified to include thermal derating. It then takes the timing scenario 120, thermal scenario 130 and thermal derate schedule 140 as input, and produces the thermal-aware (derated) timing metrics 160 as output.

Figure 7:
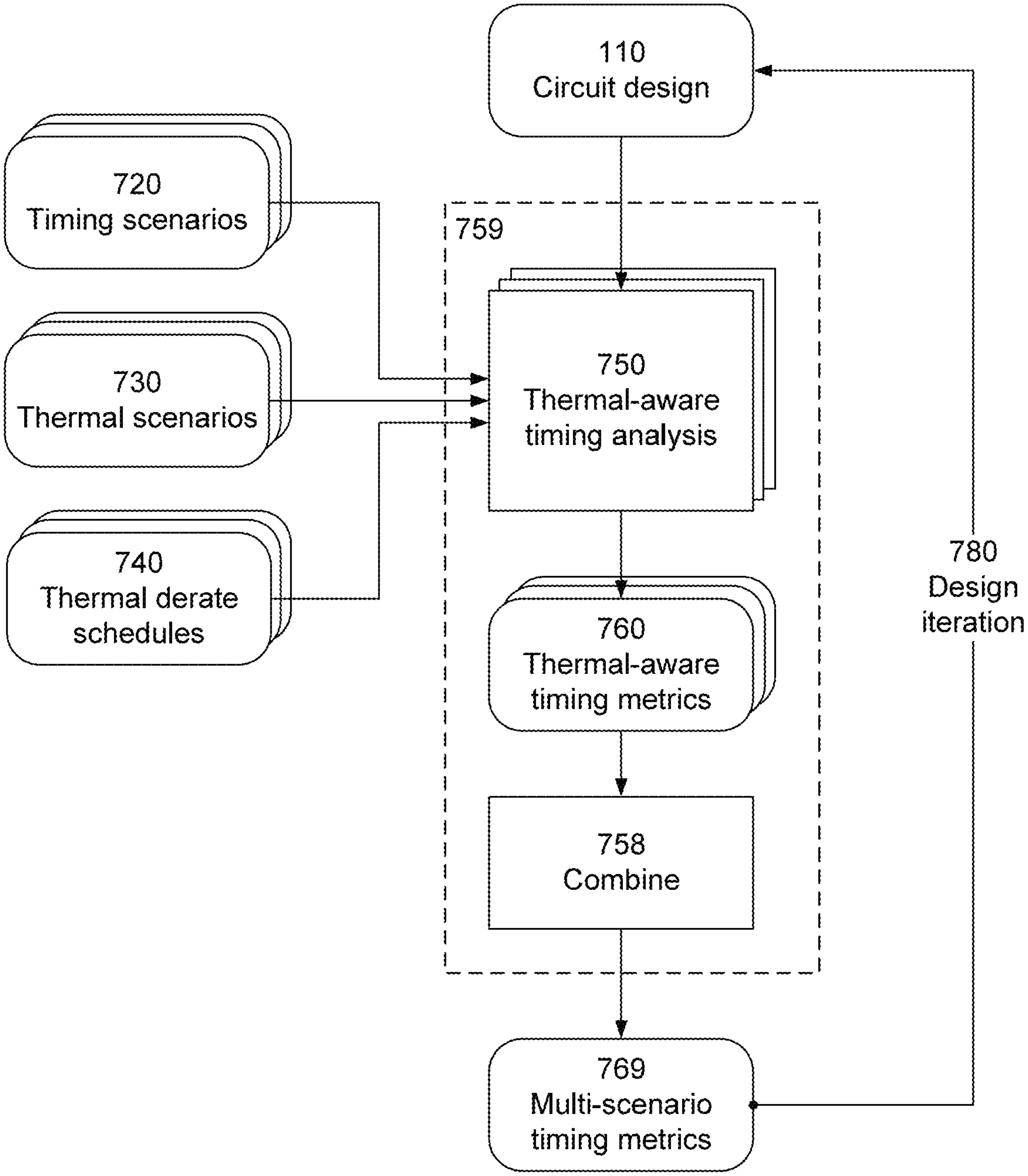
FIG. 7 is a flow diagram of a multi-scenario thermal-aware timing analysis according to embodiments of the present disclosure.

Because the derate process 156 is relatively simple and fast to compute, multiple different timing and thermal scenarios may be considered concurrently, as shown in FIG. 7. The circuit design 110 may be subject to different timing scenarios 720 and different thermal scenarios 730. Accordingly, thermal-aware timing analysis may be performed for multiple combinations of different timing scenarios and thermal scenarios, as shown within 759. At 750, thermal-aware timing analysis is performed for each of the combinations of interest, producing the derated timing metrics 760 for that scenario. At 758, optionally, the timing metrics for each individual combination are combined to produce the multi-scenario result 769. Because multiple combinations of scenarios are considered, the timing analysis at 759 is referred to as a multi-scenario timing analysis.

For example, any particular timing path in the circuit design may be required to meet timing requirements for all of the considered combinations of scenarios. In that case, the timing metrics 760 for the different combinations of scenarios may be combined at 758 by taking the worst case timing metrics from among the different results. Other types of combinations are possible, such as including the top N worst timing metrics, or the timing metrics that are worse than some threshold.

The multi-scenario analysis 759 may also output statistics, such as average, minimum and maximum values. The output may also identify which scenarios, or combinations of scenarios, produced the specific timing metrics, so that the designer can determine whether certain scenarios are especially problematic. Timing analysis may also identify critical timing paths, which are those timing paths with the worst timing performance.

At 780, all of this information may be used to fix timing violations in subsequent design iterations. The correction process may also be thermal-aware. Design iterations 780 may consider different candidate corrections to fix timing violations. The thermal derate schedule may be used to evaluate the different candidate corrections during the correction process.

In FIG. 7, the combinations of timing scenarios and thermal scenarios that are used in the multi-scenario analysis may be specified in different ways. In one approach, the multi-scenario includes all combinations of timing scenarios 720 and thermal scenarios 730. To provide more flexibility, the user may specify certain combinations to be excluded from the multi-scenario. In the reverse approach, the user may specify which combinations are included in the multi-scenario.

Even within the multi-scenario timing analysis 759, not all scenarios or all timing paths may be analyzed. For example, thermal derating may be applied only to those timing paths that a nominal timing analysis identifies as critical. As another example, some scenarios may be known to be less critical than others. If one thermal scenario is hotter than another for particular timing paths and it is known that the hotter temperatures are more problematic, then the multi-scenario analysis 759 may consider only the hotter thermal scenario for those timing paths. If different thermal scenarios are similar, they may be grouped together.

In one approach, the timing paths are constructed from cells from a cell library. The thermal derate schedule specifies the thermal derate curve for each cell in the library. A multi-scenario analysis may involve multiple libraries. For example, different libraries may be used for different voltages, process or nominal temperature. The multi-scenario analysis may include different chiplet operation mode (e.g., mission mode or test mode). If a timing scenario specifies a particular voltage, then the corresponding library and thermal derate curve is used for that scenario. In some cases, the timing scenario may specify a parameter value that does not match the nominal values for any of the libraries. In that case, values (including for the thermal derate factor) from two or more libraries may be interpolated.

Figure 8:
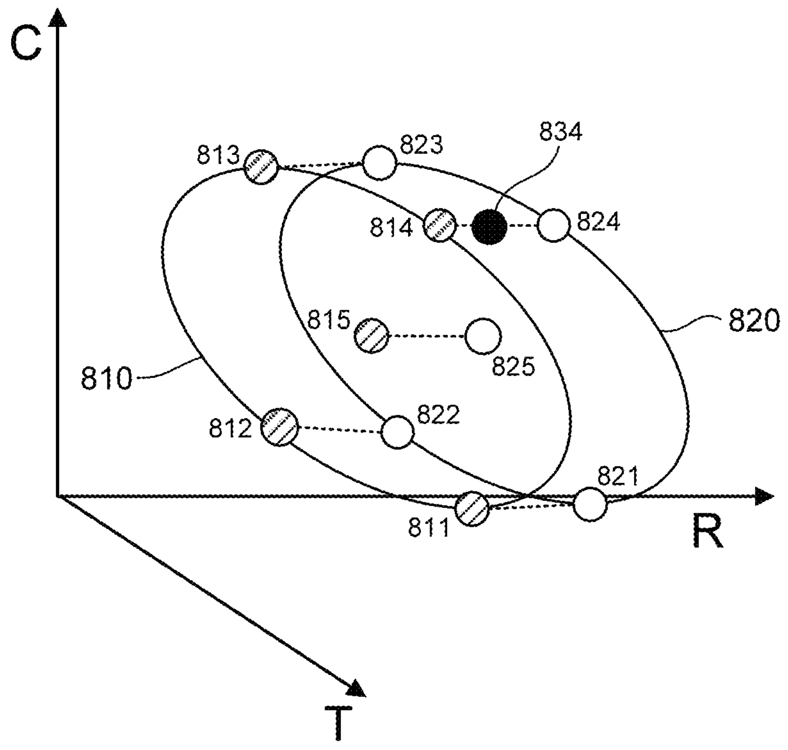
FIG. 8 illustrates adjustment of parasitic values to account for thermal effects according to embodiments of the present disclosure.

FIG. 8 illustrates a similar approach to adjust parasitic values to account for thermal effects. Timing is also affected by the electrical characteristics of interconnects. Parasitic extraction estimates the resistance and capacitance of interconnects, which also can change as a function of temperature. Rather than using the parasitic values at nominal temperatures, the values may be interpolated based on the thermal scenario applied. FIG. 8 shows RC (resistance-capacitance) ranges 810, 820 for nominal temperatures T of 40C and 100C, respectively. Each oval represents a range of RC values at that temperature. The points marked in FIG. 8 include best capacitance 811,821 and worst capacitance 813,823, best RC time constant 812,822 and worst RC time constant 814,824 and typical values 815,825. Point 834 shows interpolation of RCworst for a temperature of 60 C.

Figure 9:
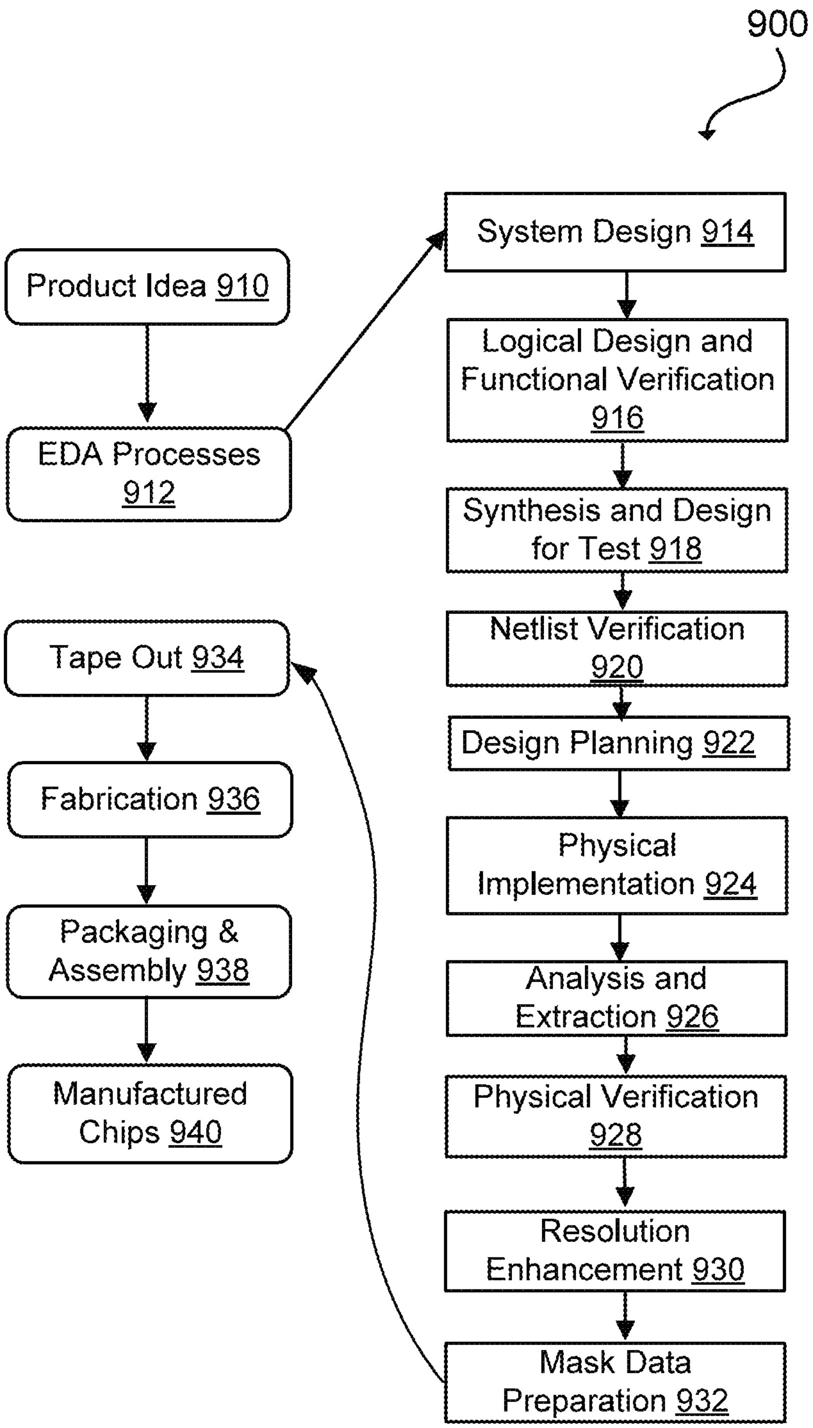
FIG. 9 is a flowchart of various processes used during the design and manufacture of an integrated circuit in accordance with some embodiments of the present disclosure.

FIG. 9 illustrates an example set of processes 900 used during the design, verification, and fabrication of an article of manufacture such as an integrated circuit to transform and verify design data and instructions that represent the integrated circuit. Each of these processes can be structured and enabled as multiple modules or operations. The term 'EDA' signifies the term 'Electronic Design Automation.' These processes start with the creation of a product idea 910 with information supplied by a designer, information which is transformed to create an article of manufacture that uses a set of EDA processes 912. When the design is finalized, the design is taped-out 934, which is when artwork (e.g., geometric patterns) for the integrated circuit is sent to a fabrication facility to manufacture the mask set, which is then used to manufacture the integrated circuit. After tape-out, a semiconductor die is fabricated 936 and packaging and assembly processes 938 are performed to produce the finished integrated circuit 940.

Specifications for a circuit or electronic structure may range from low-level transistor material layouts to high-level description languages. A high-level of representation may be used to design circuits and systems, using a hardware description language ('HDL') such as VHDL, Verilog, SystemVerilog, SystemC, MyHDL or OpenVera. The HDL description can be transformed to a logic-level register transfer level ('RTL') description, a gate-level description, a layout-level description, or a mask-level description. Each lower representation level that is a more detailed description adds more useful detail into the design description, for example, more details for the modules that include the description. The lower levels of representation that are more detailed descriptions can be generated by a computer, derived from a design library, or created by another design automation process. An example of a specification language at a lower level of representation language for specifying more detailed descriptions is SPICE, which is used for detailed descriptions of circuits with many analog components. Descriptions at each level of representation are enabled for use by the corresponding systems of that layer (e.g., a formal verification system). A design process may use a sequence depicted in FIG. 9. The processes described by be enabled by EDA products (or EDA systems).

During system design 914, functionality of an integrated circuit to be manufactured is specified. The design may be optimized for desired characteristics such as power consumption, performance, area (physical and/or lines of code), and reduction of costs, etc. Partitioning of the design into different types of modules or components can occur at this stage.

During logic design and functional verification 916, modules or components in the circuit are specified in one or more description languages and the specification is checked for functional accuracy. For example, the components of the circuit may be verified to generate outputs that match the requirements of the specification of the circuit or system being designed. Functional verification may use simulators and other programs such as testbench generators, static HDL checkers, and formal verifiers. In some embodiments, special systems of components referred to as 'emulators' or 'prototyping systems' are used to speed up the functional verification.

During synthesis and design for test 918, HDL code is transformed to a netlist. In some embodiments, a netlist may be a graph structure where edges of the graph structure represent components of a circuit and where the nodes of the graph structure represent how the components are interconnected. Both the HDL code and the netlist are hierarchical articles of manufacture that can be used by an EDA product to verify that the integrated circuit, when manufactured, performs according to the specified design. The netlist can be optimized for a target semiconductor manufacturing technology. Additionally, the finished integrated circuit may be tested to verify that the integrated circuit satisfies the requirements of the specification.

During netlist verification 920, the netlist is checked for compliance with timing constraints and for correspondence with the HDL code. During design planning 922, an overall floor plan for the integrated circuit is constructed and analyzed for timing and top-level routing.

During layout or physical implementation 924, physical placement (positioning of circuit components such as transistors or capacitors) and routing (connection of the circuit components by multiple conductors) occurs, and the selection of cells from a library to enable specific logic functions can be performed. As used herein, the term 'cell' may specify a set of transistors, other components, and interconnections that provides a Boolean logic function (e.g., AND, OR, NOT, XOR) or a storage function (such as a flipflop or latch). As used herein, a circuit 'block' may refer to two or more cells. Both a cell and a circuit block can be referred to as a module or component and are enabled as both physical structures and in simulations. Parameters are specified for selected cells (based on 'standard cells') such as size and made accessible in a database for use by EDA products.

During analysis and extraction 926, which is relevant to this disclosure, the circuit function is verified at the layout level, which permits refinement of the layout design. During physical verification 928, the layout design is checked to ensure that manufacturing constraints are correct, such as DRC constraints, electrical constraints, lithographic constraints, and that circuitry function matches the HDL design specification. During resolution enhancement 930, the geometry of the layout is transformed to improve how the circuit design is manufactured.

During tape-out, data is created to be used (after lithographic enhancements are applied if appropriate) for production of lithography masks. During mask data preparation 932, the 'tape-out' data is used to produce lithography masks that are used to produce finished integrated circuits.

A storage subsystem of a computer system (such as computer system 1000 of FIG. 10) may be used to store the programs and data structures that are used by some or all of the EDA products described herein, and products used for development of cells for the library and for physical and logical design that use the library.

Figure 10:
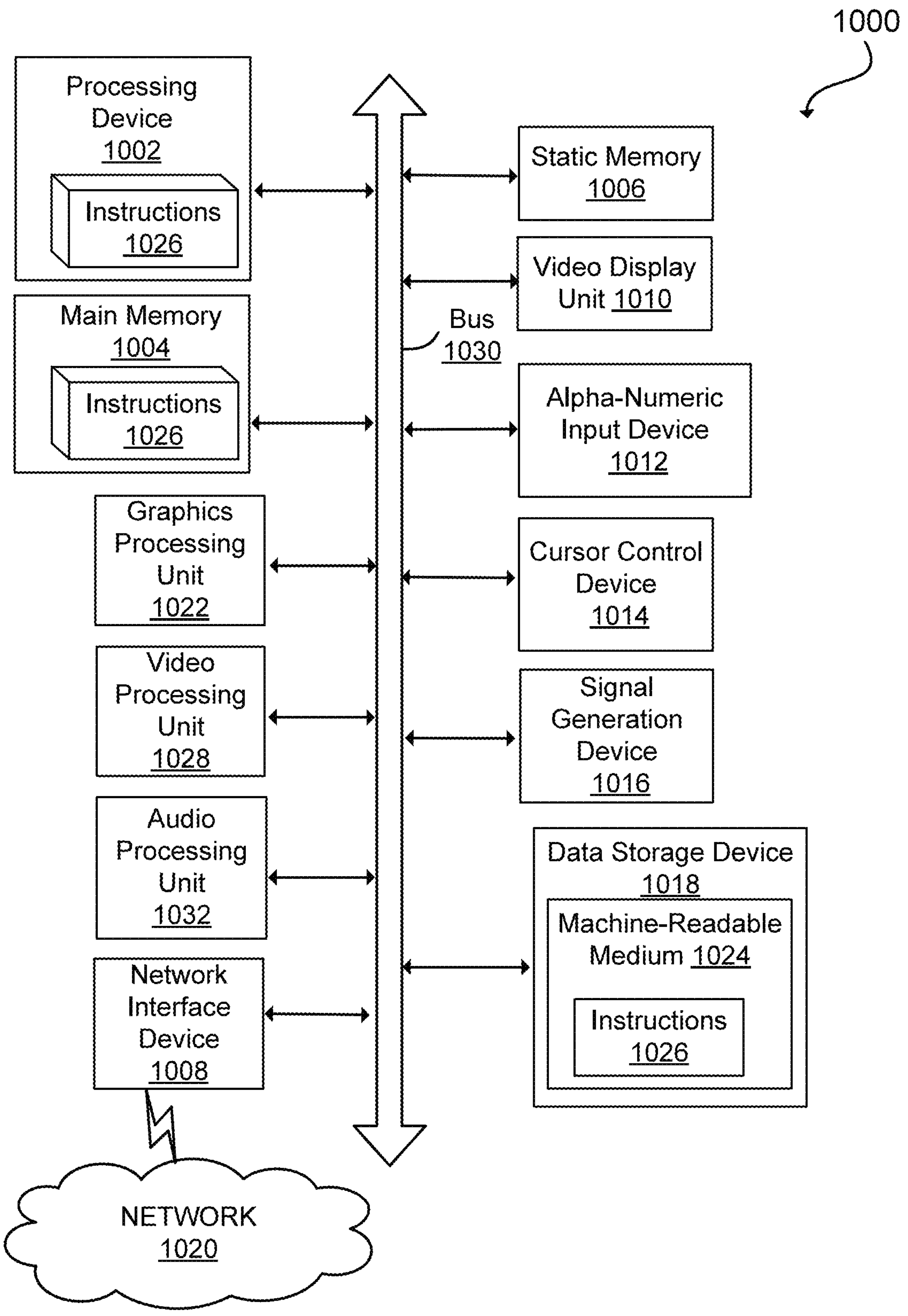
FIG. 10 is a diagram of an example computer system in which embodiments of the present disclosure may operate.

FIG. 10 illustrates an example machine of a computer system 1000 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 1000 includes a processing device 1002, a main memory 1004 (e.g., read-only memory (ROM), flash memory, dynamic random access memory (DRAM) such as synchronous DRAM (SDRAM), a static memory 1006 (e.g., flash memory, static random access memory (SRAM), etc.), and a data storage device 1018, which communicate with each other via a bus 1030.

Processing device 1002 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 1002 may also be one or more special-purpose processing devices such as an application specific integrated circuit (ASIC), a field programmable gate array (FPGA), a digital signal processor (DSP), network processor, or the like. The processing device 1002 may be configured to execute instructions 1026 for performing the operations and steps described herein.

The computer system 1000 may further include a network interface device 1008 to communicate over the network 1020. The computer system 1000 also may include a video display unit 1010 (e.g., a liquid crystal display (LCD) or a cathode ray tube (CRT)), an alphanumeric input device 1012 (e.g., a keyboard), a cursor control device 1014 (e.g., a mouse), a graphics processing unit 1022, a signal generation device 1016 (e.g., a speaker), graphics processing unit 1022, video processing unit 1028, and audio processing unit 1032.

The data storage device 1018 may include a machine-readable storage medium 1024 (also known as a non-transitory computer-readable medium) on which is stored one or more sets of instructions 1026 or software embodying any one or more of the methodologies or functions described herein. The instructions 1026 may also reside, completely or at least partially, within the main memory 1004 and/or within the processing device 1002 during execution thereof by the computer system 1000, the main memory 1004 and the processing device 1002 also constituting machine-readable storage media.

In some implementations, the instructions 1026 include instructions to implement functionality corresponding to the present disclosure. While the machine-readable storage medium 1024 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 1002 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, which may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A method comprising:

accessing timing metrics for timing paths of a circuit design comprising a plurality of components, the timing metrics evaluated at a first temperature;

accessing location-dependent temperature information for respective components of the circuit design;

accessing a thermal derate schedule that specifies adjustments to the timing metrics as a function of temperature; and adjusting, by a processing device, the timing metrics based on the thermal derate schedule and based on differences between the first temperature and the location-dependent temperature information for the respective components of the circuit design;

wherein:

the timing paths comprise pluralities of interconnected cells;

the thermal derate schedule specifies thermal derate factors for the cells in the timing paths based on the differences between the location-dependent temperature information and the first temperature; and adjusting the timing metrics comprises multiplying the timing metrics at the first temperature for individual cells times the thermal derate factors for those individual cells.

2. The method of claim 1 further comprising: repeating the method for different combinations of timing scenarios and thermal scenarios; wherein the timing metrics are evaluated under the different timing scenarios and are adjusted based on the location-dependent temperature information for the different thermal scenarios.

3. The method of claim 1 wherein:

different cell libraries containing the cells include timing models for the cells evaluated at different values of a parameter, and different thermal derate schedules are used for different cell libraries;

the timing metrics are evaluated at a first value of the parameter; and applying the thermal derate schedule to adjust the timing metrics comprises: interpolating between thermal derate schedules of different cell libraries based on the first value of the parameter.

4. The method of claim 1 wherein the circuit design includes multiple layers, and the location-dependent temperature information for the circuit design includes two-dimensional thermal maps for different layers of the circuit design.

5. The method of claim 1 wherein the location-dependent temperature information for the circuit design includes a thermal map of the circuit design.

6. The method of claim 1 wherein the location-dependent temperature information for the circuit design includes thermal gradients for the circuit design.

7. The method of claim 1 wherein the location-dependent temperature information includes thermal effects from an environment external to the circuit design.

8. A system comprising:

a memory storing instructions; and a processing device, coupled with the memory and to execute the instructions, the instructions when executed cause the processing device to:

perform a multi-scenario timing analysis of a circuit design; wherein the multi-scenario considers different combinations of timing scenarios and thermal scenarios for the circuit design, the combinations comprise at least two different thermal scenarios, and performing the multi-scenario timing analysis comprises:

for different combinations of timing scenario and thermal scenario in the multi-scenario: adjusting timing metrics for timing paths of the circuit design based on a thermal derate schedule; wherein the timing metrics before adjustment are evaluated at a first temperature for the timing scenario, and the adjustment is based on differences between the first temperature and location-dependent temperature information for the thermal scenario; and combining the adjusted timing metrics from the different combinations to generate timing metrics for the multi-scenario wherein:

the timing paths comprise pluralities of interconnected cells;

different cell libraries containing the cells include timing models for the cells evaluated at different values of a parameter, and different thermal derate schedules are used for different cell libraries;

the timing metrics are evaluated at a first value of the parameter; and adjusting timing metrics based on the thermal derate schedule further comprises:

interpolating between thermal derate schedules of different cell libraries based on the first value of the parameter.

9. The system of claim 8 wherein the multi-scenario includes at least two different thermal scenarios for different conditions for an external environment to the circuit design.

10. The system of claim 8 wherein the multi-scenario includes at least two different thermal scenarios for different operating modes of the circuit design.

11. The system of claim 8 wherein the multi-scenario includes at least two different timing scenarios for different combinations of voltage domains for the circuit design, different operating frequencies for the circuit design, different operating modes of the circuit design and/or different process, voltage, temperature (PVT) corners of the circuit design.

12. The system of claim 8 wherein the multi-scenario includes timing metrics evaluated using at least two different cell libraries.

13. The system of claim 8 wherein the multi-scenario includes all combinations of a set of timing scenarios and a set of thermal scenarios.

14. The system of claim 13 wherein the multi-scenario includes all combinations of the set of timing scenarios and the set of thermal scenarios, but excluding combinations specified by a user.

15. The system of claim 8 wherein the multi-scenario includes combinations of timing scenarios and thermal scenarios as specified by a user.

16. A non-transitory computer readable medium comprising stored instructions, which when executed by a processing device, cause the processing device to:

apply a thermal derate schedule to adjust timing metrics for timing paths of a circuit design, the timing paths comprising pluralities of components, the timing metrics evaluated at a first temperature, based on differences between the first temperature and location-dependent temperature information for respective components for the circuit design, wherein the thermal derate schedule specifies adjustments to the timing metrics as a function of temperature;

identify timing violations based on the adjusted timing metrics; and apply corrections of the timing violations, wherein the thermal derate schedule is also applied to evaluate timing metrics of candidate corrections;

wherein:

the timing paths comprise pluralities of interconnected cells;

the thermal derate schedule specifies thermal derate factors for the cells in the timing paths based on the differences between the location-dependent temperature information and the first temperature; and adjusting the timing metrics comprises multiplying the timing metrics at the first temperature for individual cells times the thermal derate factors for those individual cells.

17. The computer readable medium of claim 16 wherein identifying timing violations comprises identifying critical timing paths after applying the thermal derate schedule to the timing paths.

18. The computer readable medium of claim 16 wherein the timing metrics include delay and slew, the timing metrics are produced by a static timing analysis of the circuit design, and the timing violations include setup violations and hold violations.

19. The computer readable medium of claim 16 which further causes the processing device to:

adjust values generated by parasitic extraction of the circuit design evaluated at a second temperature, based on differences between the second temperature and the location-dependent temperature information, wherein the timing metrics are a function of the parasitic extraction.

* * * * *